(12) United States Patent
Zhong

(10) Patent No.: US 9,881,015 B2
(45) Date of Patent: Jan. 30, 2018

(54) METHOD AND SYSTEM FOR PREVIEWING FILE INFORMATION

(71) Applicant: HUIZHOU TCL MOBILE COMMUNICATION CO., LTD., Huizhou, Guangdong (CN)

(72) Inventor: Yaoxiong Zhong, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 415 days.

(21) Appl. No.: 14/387,098

(22) PCT Filed: Mar. 15, 2013

(86) PCT No.: PCT/CN2013/072570
§ 371 (c)(1),
(2) Date: Sep. 22, 2014

(87) PCT Pub. No.: WO2013/174172
PCT Pub. Date: Nov. 28, 2013

(65) Prior Publication Data
US 2015/0052178 A1    Feb. 19, 2015

(30) Foreign Application Priority Data

May 24, 2012   (CN) .......................... 2012 1 0163669

(51) Int. Cl.
*G06F 17/30*        (2006.01)
(52) U.S. Cl.
CPC .. *G06F 17/30109* (2013.01); *G06F 17/30112* (2013.01); *G06F 17/30117* (2013.01); *G06F 17/30132* (2013.01)

(58) Field of Classification Search
CPC ......... G06F 17/30085; G06F 17/30109; G06F 17/30132; G06F 17/30117; G06F 17/30112
See application file for complete search history.

(56) References Cited

U.S. PATENT DOCUMENTS 5,915,129 A  *  6/1999  Slivka ................ G06F 12/0804
                                                   707/E17.01
7,797,359 B1 *  9/2010  O'Brien-Strain . G06F 17/30091
                                                        707/829
(Continued)

FOREIGN PATENT DOCUMENTS

CN         101227602         7/2008
CN         102110105 A       6/2011
(Continued)

OTHER PUBLICATIONS

International Search Report dated May 31, 2013; PCT/CN2013/072570.

*Primary Examiner* — Tarek Chbouki
(74) *Attorney, Agent, or Firm* — Ladas & Parry LLP

(57) ABSTRACT

A method and a system for previewing file information are disclosed. The method includes: storing file information of files in a file system to a predetermined cache with a uniform file format, and establishing a file information identification number list including a unique identification number for each of the information in the cache; reading the file information identifying number list from the cache, and querying whether a file information identifying number of a file to be previewed exists in the file information identifying number list; and directly reading file information of the file to be previewed from the cache via the uniform file format if the file information identification number of the file to be previewed exists in the file information identifying number list. The present disclosure can avoid complicated decoding (Continued)

processes and implement a rapid preview of the file information.

15 Claims, 3 Drawing Sheets

(56) References Cited

U.S. PATENT DOCUMENTS

| | | | | |
|---|---|---|---|---|
| 2004/0139326 A1* | 7/2004 | Ootsuka | ............... | G06F 21/606 |
| | | | | 713/176 |
| 2008/0175565 A1 | 7/2008 | Takakura et al. | | |
| 2010/0306283 A1* | 12/2010 | Johnson | ............ | G06F 17/30085 |
| | | | | 707/803 |

FOREIGN PATENT DOCUMENTS

| | | |
|---|---|---|
| CN | 102184177 | 9/2011 |
| CN | 102314496 A | 1/2012 |
| CN | 102693305 A | 9/2012 |

* cited by examiner

METHOD AND SYSTEM FOR PREVIEWING FILE INFORMATION

CROSS REFERENCE TO RELATED APPLICATION

This application is a 371 Completion of International Application No. PCT/CN2013/072570, filed on Mar. 15, 2013. This application claims the benefit and priority of Chinese Application No. 201210163669.3, filed on May 24, 2012. The entire disclosure of each of the above applications is incorporated herein by reference.

BACKGROUND OF THE INVENTION

1. Field of the Invention

The present invention generally relates to a method and a system for previewing file information, and more particularly to a method and a system for previewing file information which stores file information of different files to a cache and then rapidly previews the file information with specific identification numbers.

2. Description of Prior Art

With the progressive development of software technology, various files have an increasing number of formats. Users could only identify a file type of a file by a filename and a filename extension in earlier years, and nowadays users can directly identify the file by file preview information including a view of a video file, a music layout, a layout of an electronic book, and a picture and so on. However, file formats, including RMVB, AVI, PDF, JPEG, and so on, continuously appear, and thus the speed of extracting file information is affected due to the complicated file formats. First, the types of the different files require identification. Then, the file information is extracted according to the types of the file formats. In particular, a video file requires a complicated decoding process to acquire a preview picture of a video stream. Accordingly, users need to wait a longer time when previewing the file information, and the users' experience is affected.

Consequently, there is a need to improve and develop the prior art.

SUMMARY OF THE INVENTION

The present invention is to solve the technical problem of the above-mentioned detects in the prior art by providing a method and a system for previewing file information. Storing file information to a cache with a uniform file format and rapidly reading the file information by identification numbers can avoid complicated decoding processes and increase the speed of extracting the file information.

A method for previewing file information comprises the following steps of:

A. Storing file information of files in a file system to a predetermined cache with a uniform file format, and establishing a file information identification number list including a unique identification number for each of the file information in the cache, wherein when an amount of the file information is greater than a maximum capacity of the cache, file information which is established earliest is deleted from the cache;

B. Reading the file information identifying number list from the cache, and determining whether a file information identifying number of a file to be previewed exists in the file information identifying number list;

C. Directly reading the file information of the file to be previewed from the cache via the uniform file format if the file information identification number of the file to be previewed exists in the file information identifying number list; and D. Deleting file information which is established earliest from the cache when an amount of the file information reaches a maximum capacity of the cache.

In the method for previewing the file information, the cache comprises a first-class cache unit disposed in a memory and a second-class cache unit disposed in the file system.

In the method for previewing the file information, the file information of the files stored in the cache is stored in the first-class cache unit first, and then stored in the second-class cache unit if a capacity of the first-class cache unit is insufficient.

The method for previewing the file information further comprises the following step after reading the file information of the file to be previewed from the file system in step C:

Reading the file information of the file to be previewed from the file system and storing the file information to the cache if the file information identification number of the file to be previewed does not exist in the file information identifying number list.

In the method for previewing the file information, information types of the file information of the files comprise a header, a version, a last modified time, a name, and a length, and the header, the version, the last modified time, the name, and the length are unified as the uniform file format.

In the method for previewing the file information, the unique identification number for each of the file information is determined according to a storage path of each of the file information of the files by using an MD5 algorithm.

A method for previewing file information comprises the following steps of:

A. Storing the file information of files in a file system to a predetermined cache with a uniform file format, and establishing a file information identification number list including a unique identification number for each of the file information in the cache;

B. Reading the file information identifying number list from the cache, and querying whether a file information identifying number of a file to be previewed exists in the file information identifying number list; and C. Directly reading file information of the file to be previewed from the cache via the uniform file format if the file information identification number of the file to be previewed exists in the file information identifying number list.

In the method for previewing the file information, when an amount of the file information reaches a maximum capacity of the cache, the file information which is established earliest is deleted.

In the method for previewing the file information, the cache comprises a first-class cache unit disposed in a memory and a second-class cache unit disposed in the file system.

In the method for previewing the file information, the file information of the files stored in the cache is stored in the first-class cache unit first, and then stored in the second-class cache unit if a capacity of the first-class cache unit is insufficient.

The method for previewing the file information further comprises the following step after step C:

Reading the file information of the file to be previewed from the file system and storing the file information to the cache if the file information identification number of the file to be previewed does not exist in the file information identifying number list.

In the method for previewing the file information, information types of the file information of the files comprise a header, a version, a last modified time, a name, and a length, and the header, the version, the last modified time, the name, and the length are unified as the uniform file format.

In the method for previewing the file information, the unique identification number for each of the file information is determined according to a storage path of each of the file information of the files by using an MD5 algorithm.

A system for previewing file information comprises a file system which stores files and further comprises:

A cache for storing file information of the files;

A presetting module for storing the file information of the files to the cache with a uniform file format and setting up a file information identification number list including a unique identification number for each of the file information in the cache;

A reading and querying module for reading the file information identification number list from the cache and querying whether a file information identification number of a file to be previewed exists in the file information identification number list;

A determining module for determining whether the file information identification number of the file to be previewed exists in the file information identification number list; and An outputting module for directly reading the file information of the file to be previewed from the cache via the uniform file format if the file information identification number of the file to be previewed exists in the file information identification number list.

The system for previewing the file information further comprises a deleting module for deleting file information which is established earliest when an amount of the file information reaches a maximum capacity of the cache.

The system for previewing the file information further comprises an extracting module for reading the file information of the file to be previewed from the file system and storing the file information to the cache if the file information identification number of the file to be previewed does not exist in the file information identifying number list.

In the system for previewing the file information, information types of the file information of the files comprise a header, a version, a last modified time, a name, and a length, and the header, the version, the last modified time, the name, and the length are unified as the uniform file format.

The system for previewing the file information further comprises an identification number generating module for determining the unique identification number for each of the file information by using an MD5 algorithm.

In the system for previewing the file information, the cache comprises a first-class cache unit disposed in a memory and a second-class cache unit disposed in the file system.

In the system for previewing the file information, a read permission of the first-class cache unit is higher than a read permission of the second-class cache unit.

In the method and system for previewing the file information provided by the present invention, the file information of the files in the file system is stored to the predetermined cache with the uniform file format, and the file information identification number list including the unique identification number for each of the file information is established in the cache. Then, the file information identification number list is read from the cache, and the file information identification number list is queried whether the file information identification number of the file to be previewed exists in the file information identification number list. If the file information identification number of the file to be previewed exists in the file information identification number list, then the file information of the file to be previewed is directly read from the cache via the uniform file format, thereby avoiding complicated decoding processes, implementing a rapid preview of the file information, and enhancing the user's experience.

BRIEF DESCRIPTION OF THE DRAWINGS

To clarify the embodiments of the present disclosure or technical schemes in the prior arts, appended drawings required in the descriptions of the embodiments and the prior arts are briefly described as follows. As is apparent, the following drawings merely illustrate some embodiments of the present disclosure. For those skilled in the art, other drawings may be presented according to the drawings without devoting effort.

DETAILED DESCRIPTION OF THE INVENTION

In order to clarify the objectives, the technical schemes, and the advantages of the present invention, the description will be made as to the embodiments of the present invention in conjunction with the accompanying drawings. It should be understood that specific embodiments described herein are merely intended to explain the present invention, but are not intended to limit the present invention.

Figure 1:
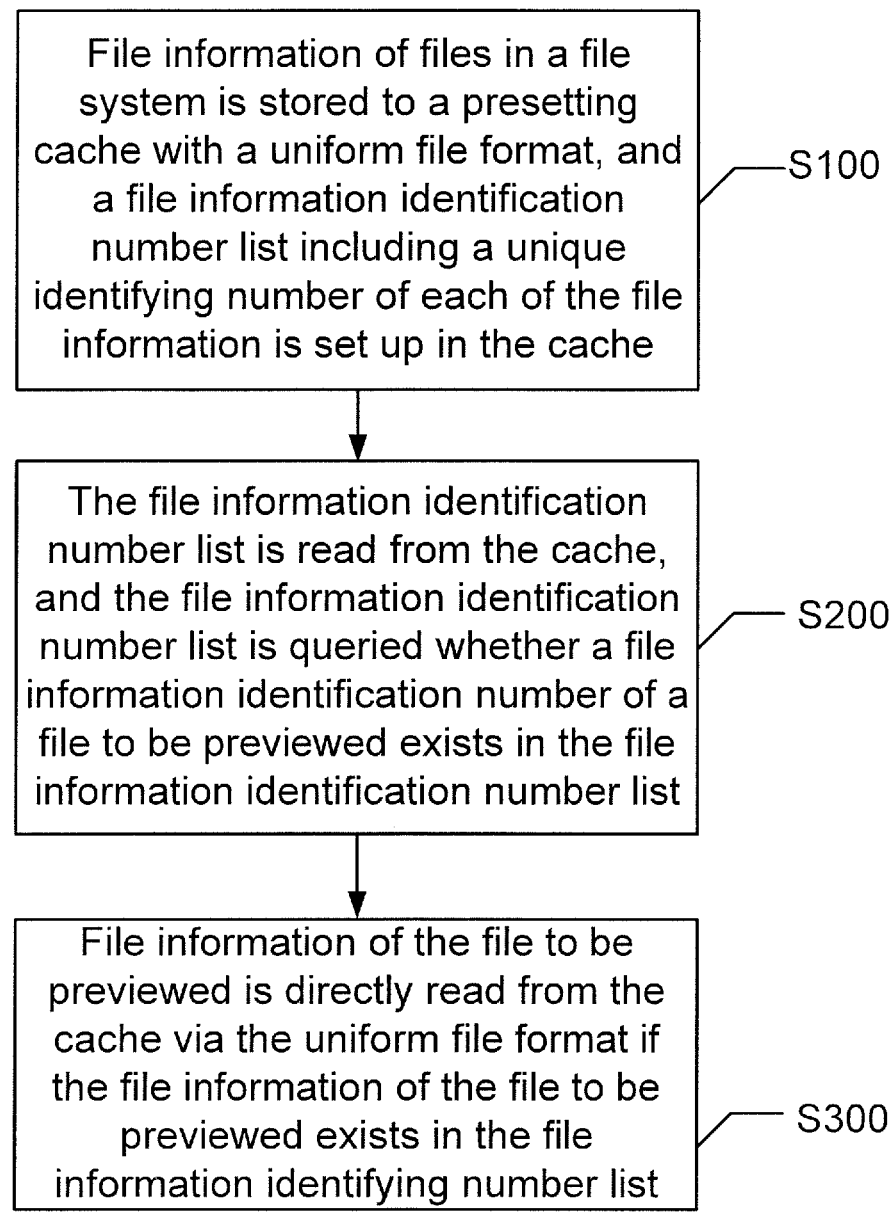
FIG. 1 is a flowchart of a method for previewing file information in accordance with the present invention.

FIG. 1 is a flowchart of a method for previewing file information provided by the present invention which mainly comprises the following steps:

In step S100, file information of files in a file system is stored to a predetermined cache with a uniform file format, and a file information identification number list including a unique identifying number of each of the file information is established in the cache.

In step S200, the file information identification number list is read from the cache, and the file information identification number list is queried whether a file information identification number of a file to be previewed exists in the file information identification number list.

In step S300, file information of the file to be previewed is directly read from the cache via the uniform file format if the file information of the file to be previewed exists in the file information identifying number list.

The detailed description of the above-mentioned steps will be made in conjunction with the following embodiments.

When a file is previewed, the file information of the file is directly read from a file system via a storage path of the file and then the file information of the file is extracted by performing corresponding decoding processes according to the file information thereof. The processes are complicated and system resources are wasted.

In step S10 of the present invention, the cache utilized for storing the file information of the files is established first. When the file information of the files is stored, the file information of the files is difficult to be stored due to different file types and different file sizes, such as videos, audios, electronic books and so on. To overcome this difficulty, the present invention redefines the uniform file format according to the same file characteristics, such as a length, a preview picture, and a name, so that different processes according to different file types are not required.

Table 1 is an example of the uniform file format in accordance with the present invention.

TABLE 1

An example of the uniform file format

| FILE FORMAT | STORAGE INFORMATION TYPE | INFORMATION LENGTH |
|---|---|---|
| TAGINFO | HEADER TAG OF UNIFORM FILE INFORMATION | 7 BYTES |
| VER | VERSION TAG | 3 BYTES |
| LASTMODI | TAG OF LAST MODIFIED TIME OF FILE | 8 BYTES |
| 1111111 | COUNTING IN SECOND FROM YEAR 1970 | VARIABLE LENGTH |
| 1.0.0 | VERSION NUMBER | 5 BYTES |
| TITLE | NAME TAG | 6 BYTES |
| title | NAME | VARIABLE LENGTH |
| LEN | LENGTH TAG | 3 BYTES |
| 1024 | LENGTH | VARIABLE SIZE |
| . . . | . . . | . . . |

In Table 1, the header tags of the file information are unified as a file format TAGINFO with the length of 7 bytes. Version tags are unified as a file format VER with the length of 3 bytes. Since there are many storage information types and they are not completely listed in Table 1, the user can define the storage information types according to his/her needs.

Furthermore, since new files are continuously generated, the cache utilized for storing the file information of the new files cannot meet requirements. Accordingly, a maximum capacity of the cache is set in the present invention. When an amount of the file information reaches the maximum capacity of the cache, the file information which is established earliest is deleted according to the time at which the file information was established. In order to increase speed at which the information is extracted, the cache of the present invention is classified into two classes including a first-class cache unit and a second-class cache unit. The first-class cache unit is stored in a memory, and the second-class cache unit is stored in the file system. When the file information of the files is stored in the cache, the file information is stored in the first-class cache unit first, and then stored in the second-class cache unit if a capacity of the first-class cache unit is insufficient.

Since each of the file information has a specific storage path, the present invention determines a unique identification number (ID number) according to the storage path of each of the file information in the file system by using the MD5 algorithm and stores the identification number of each of the file information to the file information identification number list for convenient management and subsequent querying.

The specific method of determining the identification number of the file information by using the MD5 algorithm is described as follows:

Linux@ubuntu: ~$ md5sum/mnt/hgfs/G/crash.log
28bcf6f7077f0ec9e0e9407907cbf478/mnt/hgfs/G/crash.log It should be noted that in the above-mentioned method the path of the file information crash.log is/mnt/hgfs/G/crash.log, and the ID number of the file information acquired by using the MD5 algorithm is 28bcf6f7077f0ec9e0e9407907cbf478. The ID number is unique. The acquired ID number serves as identification for acquiring the file information. The path for acquiring the file information is redirected by the ID number, and then the file information can be extracted. However, files having the same name which are stored in the same path generate the problem that the acquired file information is incorrect because it is impossible to generate the files having the same name in the same directory at the same time. Accordingly, a last modified time of the file can be added as identification, so that the acquired file information is unique and correct.

Furthermore, when a file is previewed, the file information identification number list is read and the file information identification number list is queried whether a file information identification number of the file to be previewed exists in the list in step S200 of the present invention. If the file information identification number of the file to be previewed exists in the file information identification number list, the file information of the file to be previewed is directly read from the cache via the uniform file format. If the file information identification number of the file to be previewed does not exist in the file information identification number list, the file information of the file is read from the file system and the file information is stored to the cache.

Acquiring the file information identification number list by utilizing the cache decreases the time spent on reading the cache each time. After the file information of the file to be previewed is directly read from the cache via the uniform file format, the read file information is stored to the memory so as to be conveniently extracted the next time and to decrease the time needed for reading the file system each time.

When the file information is extracted, the file information is extracted from the file system first and updated to the memory of the system for decreasing the number of times reading the file system. When a capacity of the memory reaches the maximum limit thereof, the information is read from the second-class cache unit and re-updated to the memory. In one aspect, the size of the memory of the applications can be limited; in another aspect, the speed for reading the file information can be increased.

Figure 2:
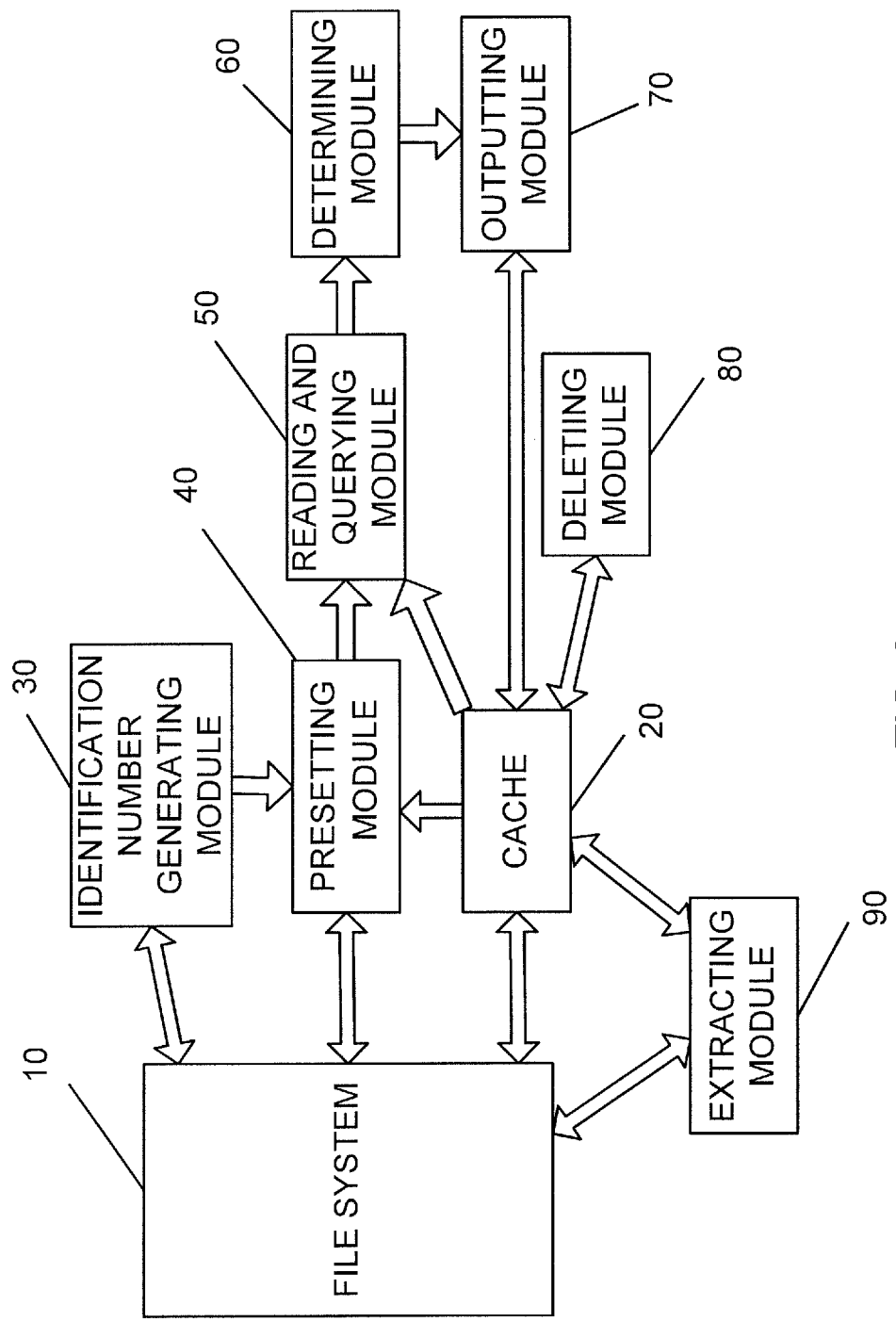
FIG. 2 is a block diagram of a system for previewing file information in accordance with the present invention.

Based on the above-mentioned method for previewing the file information, the present invention further provides a system for previewing file information. As shown in FIG. 2, the system comprises a file system 10 which stores files and further comprises: a cache 20, a presetting module 40, a reading and querying module 50, a determining module 60, and an outputting module 70. The cache 20 is utilized for storing file information of the files.

The presetting module 40 is utilized for storing the file information of the files to the cache 20 with a uniform file format and setting up a file information identification number list including a unique identification number for each of the file information in the cache 20.

The reading and querying module 50 is utilized for reading the file information identification number list from the cache 20 and querying whether a file information identification number of a file to be previewed exists in the file information identification number list.

The determining module 60 is utilized for determining whether the file information identification number of the file to be previewed exists in the file information identification number list.

The outputting module 70 is utilized for directly reading the file information of the file to be previewed from the cache 20 via the uniform file format if the file information identification number of the file to be previewed exists in the file information identification number list.

The system for previewing the file information further comprises an identification number generating module 30 utilized for determining identification numbers of the file information by using the MD5 algorithm.

The system for previewing the file information further comprises a deleting module 80 utilized for deleting the file information which is established earliest when an amount of the file information reaches the size of the cache 20. The system for previewing the file information further comprises an extracting module 90 for reading the file information of the file to be previewed from the file system 10 and storing the file information to the cache 20 if the file information identification number of the file to be previewed does not exist in the file information identifying number list.

Figure 3:
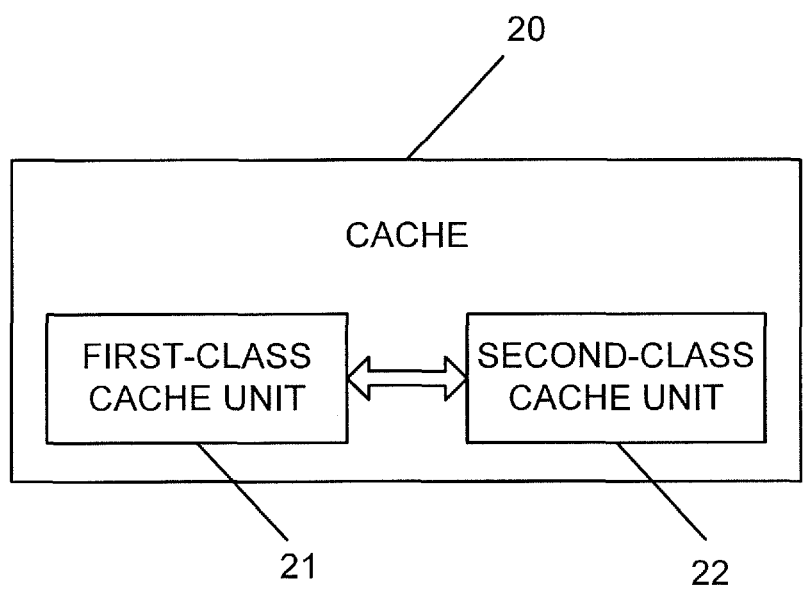
FIG. 3 is a constitute diagram of a cache in the system for previewing the file information.

As shown in FIG. 3, the cache 20 comprises a first-class cache unit 21 disposed in a memory and a second-class cache unit 22 disposed in the file system 10, and the read permission of the first-class cache unit 21 is higher than the read permission of the second-class cache unit 22.

In the method and system for previewing the file information provided by the present invention, the file information of the files in the file system is stored to the predetermined cache with the uniform file format, and the file information identification number list including the unique identification number for each of the file information is established in the cache. Then, the file information identification number list is read from the cache, and the file information identification number list is queried whether the file information identification number of the file to be previewed exists in the file information identification number list. If the file information identification number of the file to be previewed exists in the file information identification number list, the file information of the file to be previewed is directly read from the cache via the uniform file format, thereby avoiding complicated decoding processes, implementing a rapid preview of the file information, and enhancing the user's experience.

As is understood by a person skilled in the art, the foregoing preferred embodiments of the present invention are illustrative rather than limiting of the present invention. It is intended that various modifications and similar arrangements are to be included within the spirit and scope of the appended claims, the scope of which should be accorded the broadest interpretation so as to encompass all such modifications and similar structures.

What is claimed is:

1. A method for previewing file information, comprising the following steps of:
   A. storing file information of files in a file system to a predetermined cache with a uniform file format, and establishing a file information identification number list including a unique identification number for each of the file information in the cache, wherein when an amount of the file information reaches a maximum capacity of the cache, file information which is established earliest is deleted from the cache; wherein information types of the file information of the files comprise a header, a version, a last modified time, a name, and a length, and the header, the version, the last modified time, the name, and the length are unified as the uniform file format;
   B. reading the file information identifying number list from the cache, and determining whether a file information identifying number of a file to be previewed exists in the file information identifying number list;
   C. directly reading file information of the file to be previewed from the cache via the uniform file format as a preview if the file information identification number of the file to be previewed exists in the file information identifying number list; and
   D. reading the file information of the file to be previewed from the file system if the file information identification number of the file to be previewed does not exist in the file information identifying number list,
   wherein the unique identification number for each of the file information is determined according to a storage path of each of the file information of the files.

2. The method for previewing the file information of claim 1, wherein the cache comprises a first-class cache unit disposed in a memory and a second-class cache unit disposed in the file system.

3. The method for previewing the file information of claim 2, wherein the file information of the files stored in the cache is stored in the first-class cache unit first, and then stored in the second-class cache unit if a capacity of the first-class cache unit is insufficient.

4. The method for previewing the file information of claim 1, further comprising the following step after reading the file information of the file to be previewed from the file system in step D:
   storing the file information of the file to be previewed to the cache.

5. The method for previewing the file information of claim 1, wherein the unique identification number for each of the file information is determined according to the storage path of each of the file information of the files by using an MD5 algorithm.

6. A method for previewing file information, comprising the following steps of:
   A. storing file information of files in a file system to a predetermined cache with a uniform file format, and establishing a file information identification number list including a unique identification number for each of the file information in the cache; wherein information types of the file information of the files comprise a header, a version, a last modified time, a name, and a length, and the header, the version, the last modified time, the name, and the length are unified as the uniform file format;
   B. reading the file information identifying number list from the cache, and determining whether a file information identifying number of a file to be previewed exists hi the file information identifying number list; and
   C, directly reading the information of the file to be previewed from the cache via the uniform file format as a preview if the file information identification number of the file to be previewed exists in the file information identifying number list,
   wherein when an amount of the file information reaches a maximum capacity of the cache, The information which is established earnest is deleted from the cache,
   wherein the unique identification number for each of the file information is determined according to a storage path of each of the file information of the files.

7. The method for previewing the file information of claim 6, wherein the cache comprises a first-class cache unit disposed in a memory and a second-class cache unit disposed in the file system.

8. The method for previewing the file information of claim 7, wherein the file information of the files stored in the cache is stored in the first-class cache unit first, and then stored in the second-class cache unit if a capacity of the first-class cache unit is insufficient.

9. The method for previewing the file information of claim 6, further comprising the following step after step C:
reading the file information of the file to be previewed from the file system and storing the file information to the cache if the file information identification number of the file to be previewed does not exist in the file information identifying number list.

10. The method for previewing the file information of claim 6, wherein the unique identification number for each of the file information is determined according to the storage path of each of the file information of the files by using an MD5 algorithm.

11. A system for previewing file information, comprising:
a processor and a memory;
a file system for storing files;
a cache for storing file information of the files;
the processor storing the file information of the files to the cache with a uniform file format and establishing a file information identification number list including a unique identification number for each of the file information in the cache; wherein information types of the file information of the files comprise a header, a version, a last modified time, a name, and a length, and the header, the version, the last modified time, the name, and the length are unified as the uniform file format;
the processor reading the file information identification number list from the cache and determining whether a file information identification number of a file to be previewed exists in the file information identification number list;
the processor determining whether the file information identification number of the file to be previewed exists in the file information identification number list;
the processor directly reading the file information of the file to be previewed from the cache via the uniform file format as a preview if the file information identification number of the file to be previewed exists in the file information identification number list;
the processor deleting file information which is established earliest when an amount of the file information reaches a maximum capacity of the cache; and
the processor determining the unique identification number for each of the file information of the files according to a storage path of each of the file information of the files.

12. The system for previewing the file information of claim 11, wherein the processor further reads the file information of the file to be previewed from the file system and storing the file information to the cache if the file information identification number of the file to be previewed does not exist in the file information identifying number list.

13. The system for previewing the file information of claim 11, wherein the processor determines the unique identification number for each of the file information of the files by using an MD5 algorithm.

14. The system for previewing the file information of claim 11, wherein the cache comprises a first-class cache unit disposed in a memory and a second-class cache unit disposed in the file system.

15. The system for previewing the file information of claim 14, wherein a read permission of the first-class cache unit is higher than a read permission of the second-class cache unit.

* * * * *